(12) United States Patent
Bowyer et al.

(10) Patent No.: US 9,828,970 B2
(45) Date of Patent: Nov. 28, 2017

(54) WIND TURBINE WITH A REFLECTIVE MEMORY SYSTEM

(71) Applicant: Vestas Wind Systems A/S, Aarhus N (DK)

(72) Inventors: Robert Bowyer, London (GB); Siew Hoon Lim, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 14/389,292

(22) PCT Filed: Mar. 26, 2013

(86) PCT No.: PCT/DK2013/050087
§ 371 (c)(1),
(2) Date: Sep. 29, 2014

(87) PCT Pub. No.: WO2013/143545
PCT Pub. Date: Oct. 3, 2013

(65) Prior Publication Data
US 2015/0167640 A1 Jun. 18, 2015

Related U.S. Application Data (60) Provisional application No. 61/617,684, filed on Mar. 30, 2012.

(30) Foreign Application Priority Data

Apr. 13, 2012 (DK) .................................. 2012 70187

(51) Int. Cl.
*F03D 7/04* (2006.01)
*G05B 19/042* (2006.01)

(52) U.S. Cl.
CPC .............. *F03D 7/04* (2013.01); *F03D 7/047* (2013.01); *G05B 19/0421* (2013.01); *G05B 2219/2619* (2013.01); *Y02E 10/723* (2013.01)

(58) Field of Classification Search
CPC  Y02E 10/723; Y02E 10/725; H02P 2009/004
(Continued)

(56) References Cited

U.S. PATENT DOCUMENTS 5,960,458 A * 9/1999 Kametani ............ G06F 15/167
711/147
6,295,584 B1   9/2001 Desota et al.
(Continued)

FOREIGN PATENT DOCUMENTS

EP    2410174 A1    1/2012
WO    2006/069573 A1    7/2006

OTHER PUBLICATIONS

"Industrial and embedded control, data acquisition and logging", United Electronic Industries, Inc., vol. 12, Jan. 2012, pp. 1-42.
(Continued)

*Primary Examiner* — Tulsidas C Patel
*Assistant Examiner* — Charles Reid, Jr.
(74) *Attorney, Agent, or Firm* — Patterson + Sheridan, LLP (57) ABSTRACT

A wind turbine is provided. The wind turbine includes a plurality of control systems. The wind turbine further includes a reflective memory system. The plurality of control systems is coupled with the reflective memory system. Each of the plurality of control systems may include a respective memory of the reflective memory system. In response to data being written into one of the respective memories, the reflective memory system may automatically replicate the data to other respective memories.

11 Claims, 6 Drawing Sheets

(58) Field of Classification Search
USPC .................................................. 290/44, 55
See application file for complete search history.

(56) References Cited

U.S. PATENT DOCUMENTS

| | | | |
|---|---|---|---|
| 7,240,143 B1 | 7/2007 | Scheffler et al. | |
| 7,647,454 B2* | 1/2010 | Aguilera | G06F 9/466 709/214 |
| 8,585,363 B2* | 11/2013 | Jeppesen | F03D 7/0224 416/1 |
| 2009/0309360 A1 | 12/2009 | Jurkat | |
| 2010/0268849 A1* | 10/2010 | Bengtson | G05B 15/02 709/248 |
| 2012/0020786 A1* | 1/2012 | Ayres | F03D 7/047 416/1 |

OTHER PUBLICATIONS

"Real Time Networking with Reflective Memory", GE Fanuc, Embedded Systems, Jan. 1, 2007 pp. 1-10.
John B. Mcintosh: "Wind Turbine Drivetrain Test Facility Data Acquisition System", Feb. 1, 2012, pp. 1-4.
International Search Report for PCT/DK2013/050087, dated Jun. 27, 2013.
Danish Search Report for PA 2012 70187, dated Nov. 23, 2012.

* cited by examiner

WIND TURBINE WITH A REFLECTIVE MEMORY SYSTEM

TECHNICAL FIELD

The present invention relates generally to a wind turbine.

BACKGROUND

In the recent years, demand for green energy has increased. Wind turbines, which convert wind energy into electrical energy, are a means for green energy. As such, reliance on wind energy has also increased over the recent years.

Currently on the existing wind turbine, data transfer and sharing technique using Ethernet protocols such as TCP/IP or UDP is a software-based approach, managed by the wind turbine controller software. However, software-based approach such as TCP/IP or UDP has the disadvantage that it is not deterministic due to, for example, network collisions or message collisions.

SUMMARY

According to one embodiment, a wind turbine is provided. The wind turbine includes a plurality of control systems. The wind turbine further includes a reflective memory system. The plurality of control systems is coupled with the reflective memory system.

According to one embodiment, the plurality of control systems are connected by a communication network.

According to one embodiment, the plurality of control systems includes at least one of a power control system, a pitch control system and a yaw control system.

According to one embodiment, the reflective memory system includes a memory for each control system of the plurality of control systems.

According to one embodiment, the memory for each control system comprises a dual port memory.

According to one embodiment, when data is written to the memory of a control system of the plurality of control systems, the data is automatically replicated to the memories of other control systems.

According to one embodiment, each memory of a control system of the plurality of control systems is accessible by all the other control systems of the plurality of control systems.

According to one embodiment, a control system of the plurality of control systems is configured to inform the other control systems of the plurality of control systems of the update of the data when data is written to the memory of the control system.

According to one embodiment, the plurality of control systems are connected via copper or fiber optic cable.

According to one embodiment, the plurality of control systems are connected on a ring or star topology.

According to one embodiment, the plurality of control systems are synchronized.

According to one embodiment, each of the plurality of control systems includes a synchronization clock circuit, and the plurality of control systems are synchronized with the respective synchronization clock circuit of each control system.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
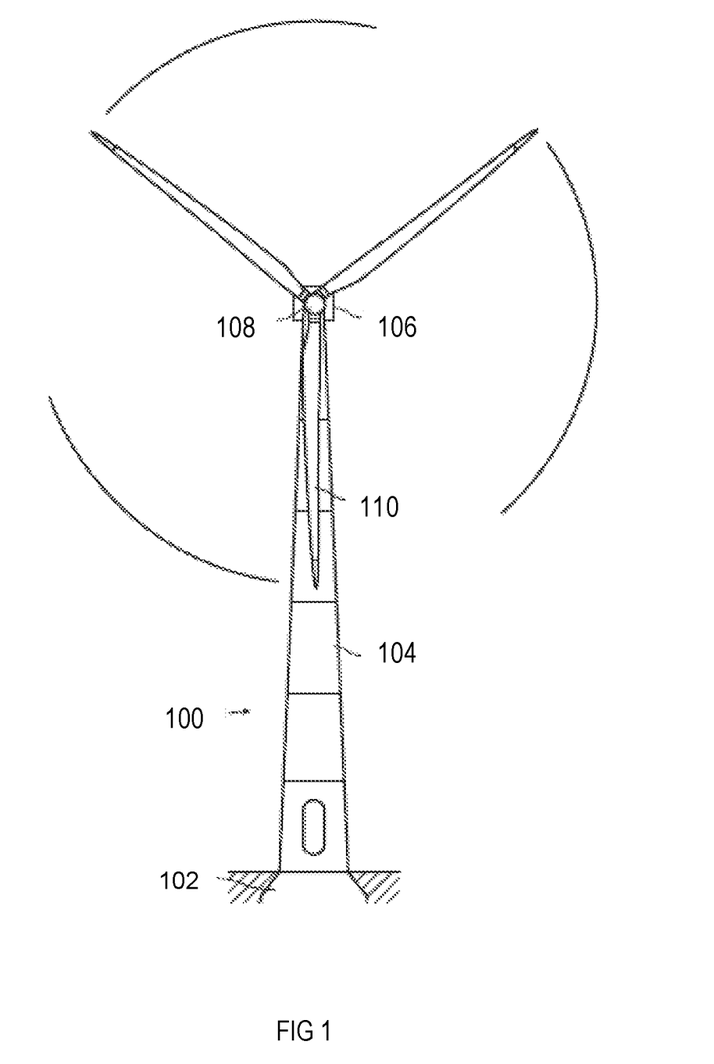
FIG. 1 illustrates a common setup of a conventional wind turbine.

FIG. 1 illustrates a common setup of a conventional wind turbine 100. The wind turbine 100 is mounted on a base 102. The wind turbine 100 includes a tower 104 having a number of tower sections. A wind turbine nacelle 106 is placed on top of the tower 104. The wind turbine rotor includes a hub 108 and at least one rotor blade 110, e.g. three rotor blades 110.

The rotor blades 110 are connected to the hub 108 which in turn is connected to the nacelle 106 through a low speed shaft which extends out of the front of the nacelle 106. The low speed shaft typically drives a generator (not shown) for producing electrical power. The electrical power generated is thereafter usually conditioned by a converter system (not shown), comprising a power converter, prior to delivery from the wind turbine to a grid.

Figure 2:
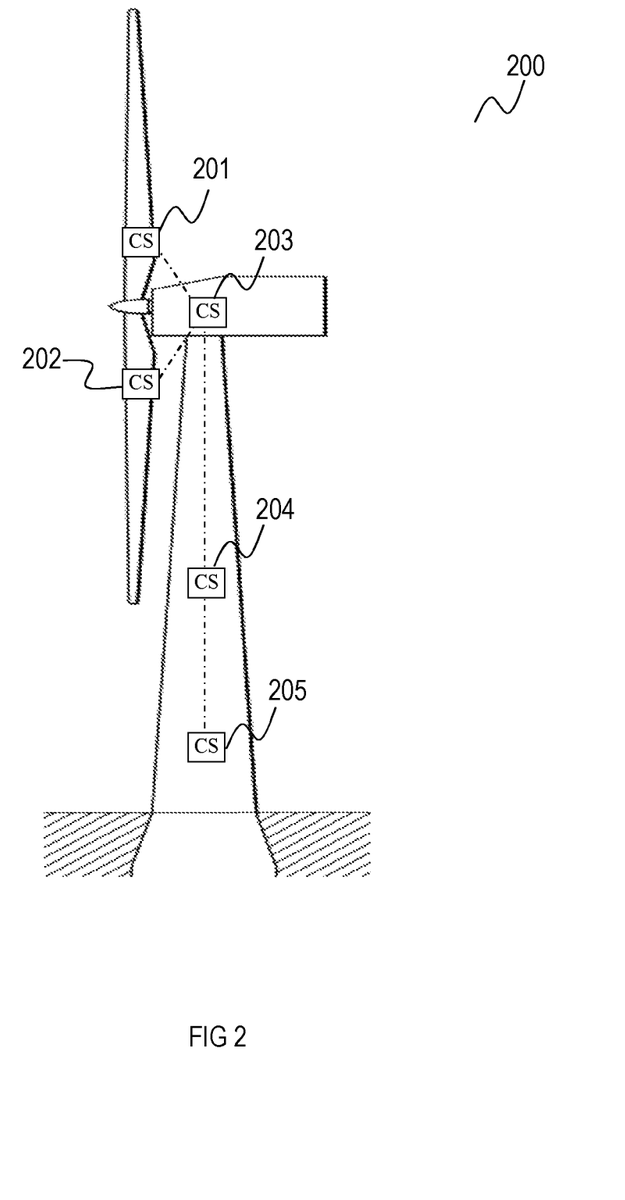
FIG. 2 shows the side view of a wind turbine according to one embodiment.

FIG. 2 shows the side view of a wind turbine 200 according to one embodiment. Illustratively, the wind turbine 200 may include a plurality of control systems (or controllers) 201, 202, 203, 204, and 205. The control systems 201 to 205 may be connected by a communication network. It is noted that the number and locations of the control systems shown in FIG. 2 is not limited thereto but only for illustration purpose. Illustratively, for example, the control systems 201 and 202 may comprise pitch control systems. The control system 203 may comprise a power control system. The control system 204 may comprise a yaw control system. The control system 205 may comprise a main controller system. The wind turbine control systems 201 to 205 may be connected using deterministic communications network which has systems consistent and deterministic data transfer latency. Generally, a deterministic communication network guarantees that data is available at fixed rates to all the nodes in the system. The wind turbine 200 may further include a reflective memory system (not shown). The plurality of control systems 201 to 205 may be coupled to the reflective memory system.

Reflective memory is a type of distributed shared memory (DSM). Generally, the reflective memory is a hardware-based communication mechanism for sharing data between computers and allows simultaneous reads and writes to multiple memories.

Reflective memory provides a mechanism for sharing data among the nodes of a distributed system. Unlike TCP/IP or UDP, reflective memory provides deterministic operation without added software overhead. Real-time deterministic data communication network is an important prerequisite for successful implementation of DSM. The wind turbine control and communication backbone may be based on Time Triggered Protocol, a type of real-time deterministic communication network.

According to one embodiment, the reflective memory system in the wind turbine 200 may include a memory (e.g. dual port memory) for each of the plurality of control systems 201 to 205 such that data may be shared among the plurality of control systems 201 to 205. For example, the memory for each of the plurality of control systems may be buffer (e.g. hardware memory) on the local control system, or other data structure in a shared system memory (e.g. availability of memory space in other global nodes), or shared data cloud between control systems. In one exemplary embodiment, each control system of the plurality of control systems 201 to 205 may host a DSM interface which contains a set amount of onboard memory, which may, for example, range from kilobytes to several megabytes. This onboard memory may be used as the shared memory that may be simultaneously accessed by multiple wind turbine programs with the intent to provide communication among them or avoid redundant copies. A control system (e.g. 201) of the plurality of control systems may be configured to inform (e.g. by interrupt) the other control systems (e.g. 202 to 205) of the plurality of control systems of the update of the data when data is written to the memory of the control system (e.g. 201).

Depending on the context, the wind turbine program(s) may run on a single processor or on multiple separate processors. Through data sharing between the various wind turbine control systems, each control system may always have an up-to-date copy of the shared memory set transmitted on their real-time, highly deterministic data communication network. Each wind turbine control system that has the DSM interface may be connected via copper or fiber optic cable, on a ring or star topology with or without a network switch. When a wind turbine control system writes data to its DSM interface, the hardware may automatically replicate the data to the memory on all the other control systems of the network. Each control system may be able to see the data almost instantaneously at the same address offset where it was written on the originating node. The transport mechanism, error checking, arbitration, etc may be transparent to the user.

According to one embodiment, when data is written on the memory of a control system of the plurality of control systems 201 to 205, the data is automatically replicated on to the memories of other control systems. For example, when data is written on the memory of the control system 201, the data may be automatically replicated on to the memories of other control systems 202 to 205. Communication network may have the hardware (e.g. trigger lines) and software (e.g. interrupts) capability to perform signalling from one control system to another control system when events (e.g. update of data) occur. For example, when data is written on the memory of one control system 201, the trigger line connecting the control system 201 and 203 may be configured to generate an interrupt to the control system 203 informing the control system 203 of the event that data is written on the memory of the control system 201. Upon receiving the interrupt, the control system 203 may replicate the data or read data from the memory of the control system 201.

According to one embodiment, each memory of a control system of the plurality of control systems 201 to 205 is accessible by all the other control systems of the plurality of control systems. For example, the memory of the control system 201 may be accessible by all the other control systems 202 to 205.

Figure 3:
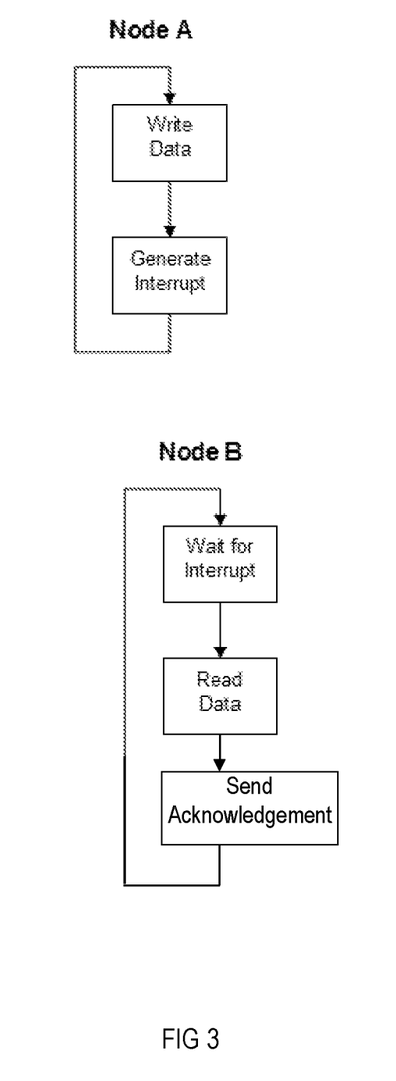
FIG. 3 illustrates a data sharing mechanism between two control systems within a wind turbine.

According to one embodiment, the plurality of control systems 201 to 205 is synchronized. In a further embodiment, each of the plurality of control systems 201 to 205 includes a synchronization clock circuit, and the plurality of control systems is synchronized with the respective synchronization clock circuit of each control system. FIG. 3 illustrates the data sharing mechanism between two control systems.

The reflective memory system in the wind turbine 200 shown in FIG. 2 may enable synchronization of data generation and consumption among the plurality of control systems. For example, each control system may signal the others when new data has been posted or some action needs to be taken by another control system.

In one embodiment, the reflective memory system may signal other control system(s) via hardware interrupts whose purpose is to inform a processor (CPU) of another control system that an event that requires immediate servicing has occurred.

Interrupts may be generated locally or remotely. The reflective memory may be programmed to generate a local interrupt to inform its host CPU whenever some event (e.g. a particular data location has been updated) has occurred. Similarly, remote interrupts may be generated when a control system needs to inform another control system that an event has occurred.

By using interrupts, a handshaking mechanism may be created between multiple control systems to effectively synchronize the data transfer.

FIG. 3 shows an example execution flow using interrupts. In this example, control system A is streaming data to control system B via the reflective memory network. Handshaking may be used so that control system A may inform control system B when new data is ready. As shown in FIG. 3, when data is written on to the memory of control system A, interrupt is generated. The control system B waits for interrupt, and when control system B receives an interrupt, control system B may read data from control system A. After the control system B reads data residing on the control system A, the control system B may send acknowledgement to the control system A, and then keep waiting for a next interrupt.

Figure 4:
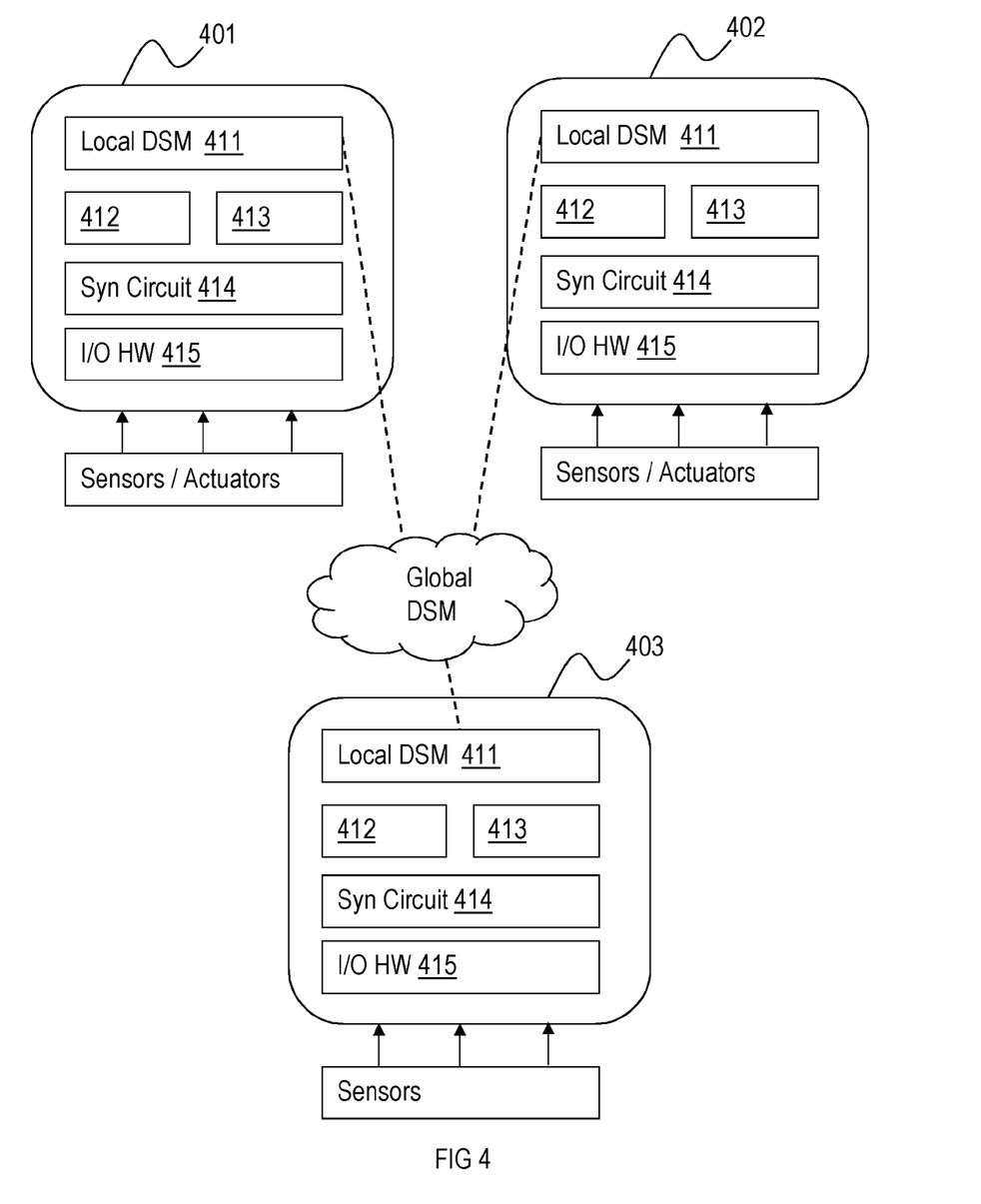
FIG. 4 illustrates the data sharing mechanism among a plurality of control systems within a wind turbine according to an exemplary embodiment.

FIG. 4 illustrates the data update mechanism among different control systems within a wind turbine.

For illustration purpose only, assume that there are three control systems in the wind turbine, i.e. a control system 401 for the rotor of the wind turbine, a control system 402 for the drive train of the wind turbine, and a control system 403 located in the tower of the wind turbine. Each of the control systems 401, 402 and 403 may include a local memory (e.g. DSM) 411 which may be volatile or non-volatile, a processor 412, a communication port 413, a synchronization circuit 414, and an input/output hardware 415. The control systems 401 to 403 may be connected to each other in ring or star topology. The memories 411 of the control systems 401 to 403 may be, for example, connected to a global memory. For example, the input/output hardware of the control system 401 may be connected to sensors or actuators for measuring wind speed and wind direction. The input/output hardware of the control system 402 may be connected to sensors/actuators for measuring the generator temperature, converter voltage and current.

The inputs/outputs hardware of the control system 403 may be connected to sensors for the motors and encoder. The control system 403 may be a main controller in the wind turbine, and the control systems 401 and 402 may be distributed control systems in the wind turbine.

In FIG. 4, for example, when data is updated in the memory 411 of the control system 401, the control system 401 may be configured to generate an interrupt informing the control systems 402 and 403 of the update of data. The control systems 402 and 403 may then read data from the local memory 411 of the control system 401. Alternatively, the data updated in the control system 401 may be duplicated on to the global memory which is accessible to the control systems 402 and 403.

Figure 5:
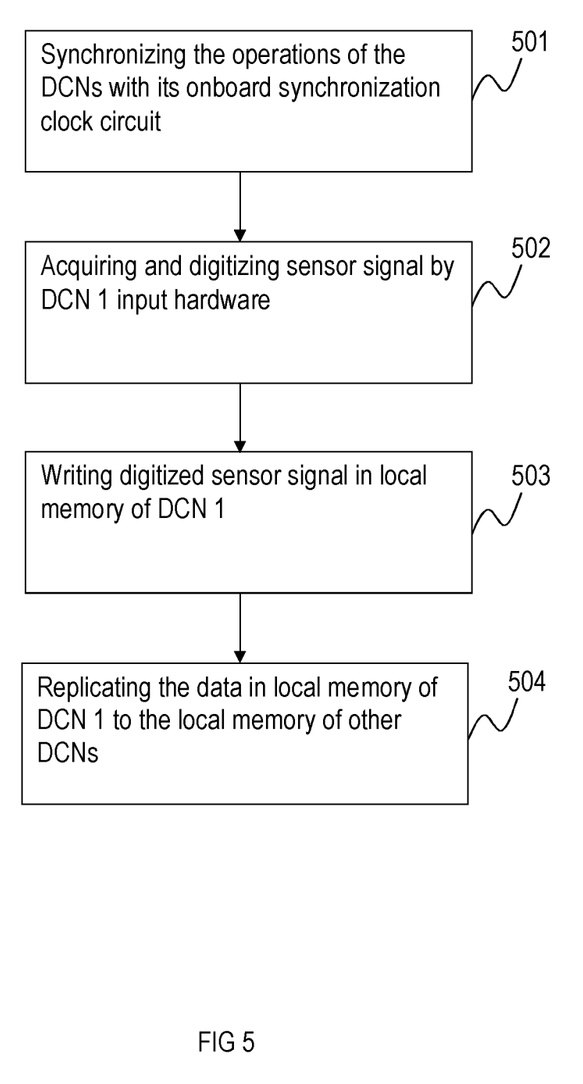
FIG. 5 shows a flow-chart of a method of sharing data according to an exemplary embodiment.

FIG. 5 shows a flowchart of a method for updating data among the control systems within a wind turbine according to one exemplary embodiment.

In 501, control systems (e.g. distributed control nodes (DCN)) which are connected together by a common deterministic network have their operations synchronized with its onboard synchronization clock circuit. For example, referring to FIG. 4, the control systems 401 to 403 may be connected together by a common deterministic network and have their operations synchronized with the respective onboard synchronization clock circuit.

In 502, control system DCN 1 (e.g. control system 401 shown in FIG. 4) input hardware (e.g. analogue to digital converter) acquires and digitizes a sensor signal.

In 503, digitized sensor signal is written into DCN 1's local memory (e.g. DSM), which may be configured as a circular first-in-first-out (FIFO) buffer. FIFO data storage operation may be managed and controlled by each DCN's onboard synchronization clock circuit. In a distributed control node (DCN) system, a circular FIFO buffer may be implemented using a section of distributed shared memory.

In 504, DCN 1 data in local FIFO is replicated to buffers of all the other DCNs (e.g. control systems 402 and 403 shown in FIG. 4) in the same network using synchronization method described with reference to FIG. 3. That is, when the digitized sensor signal is written into DCN 1 (e.g. control system 401)'s local memory, an interrupt is generated informing all the other DCNs (e.g. control systems 402 and 403) such that all the other DCNs may read data from the DCN 1's local memory and replicate the data.

Figure 6:
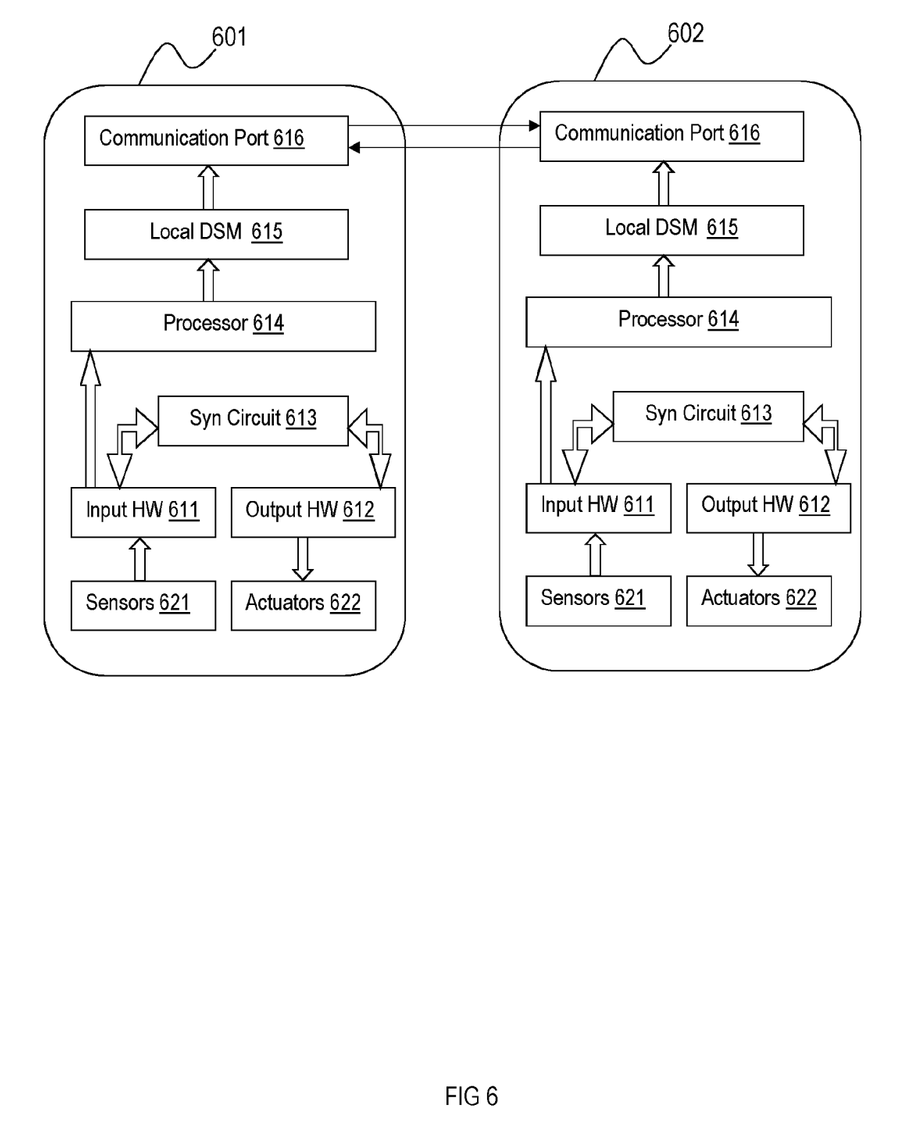
FIG. 6 illustrates the data sharing mechanism among two control systems within a wind turbine according to an exemplary embodiment.

FIG. 6 illustrates the process of data update between the control system 601 and the control system 602 within a wind turbine. The control systems 601 and 602 may be connected together by a common deterministic network.

Each of the control systems 601 and 602 includes input hardware 611 (such as analogue to digital converter (ADC) or DI channels), output hardware 612 (such as digital to analogue converter (DAC) or DO channels), a synchronization circuit 613, a processor 614, a local memory (e.g. DSM) 615, and a communication port 616. The inputs hardware 611 may be connected to sensors 621. The inputs hardware 611 may be configured to digitize analogue or digital input signals. The output hardware 612 may be configured to output analogue or digital output signals to actuators or motors 622. The synchronization circuit 613 may be configured to synchronize the input hardware 611 and the output hardware 612. The synchronization circuits 613 in the control systems 601 and 602 may also be configured to synchronize the control systems 601 and 602. The digitized data may be processed in the processor 614 and the processor 614 may be configured to write processed data to the memory 615.

An interrupt may be generated by the communication port 616 of the control system 601 to the communication port 616 of the control system 602. The control system 602 waits for interrupt. Upon receiving of the interrupt from the control system 601, the control system 602 is configured to read data from the memory 615 of the control system 601 and then replicate the data in the local memory 615 of the control system 602.

Various embodiments provide a hardware-based method of sharing data within a wind turbine control network that includes multiple wind turbine control systems using distributed shared memory access technique, e.g. reflective memory. The wind turbine control system may be connected to an external control and/or monitoring system from which it receives control commands and to which it sends data regarding the operation of the wind turbine. Such an external control and/or monitoring system may be a SCADA (supervisory control and data acquisition) system arranged for monitoring and controlling the operation of the wind turbine. Typically, the external control and/or monitoring system is located remotely from the wind turbine generator so as to facilitate control and/or monitoring of the operation of the wind turbine generator from a remote location. Distributed shared memory described herein is different from other data sharing technologies such as TCP/IP or UDP that are commonly used in 'soft' real-time applications, as it is a communication mechanism implemented in hardware for sharing data between wind turbine control systems.

Various embodiments provide a hardware-based approach, delivering deterministic data streaming in a distributed wind turbine control network that comprises of multiple wind turbine control systems.

Various embodiments provide an integrated hardware and software based method to share data between monitoring and control systems in the wind turbine using the distributed shared memory (reflective memory).

The wind turbine as described herein provides the ability to share data in a timely and deterministic fashion between multiple wind turbine control systems while meeting the performance and determinism requirement of the entire system. Timely, deterministic data sharing is important for wind turbine critical control operations for example in pitch control or yaw control systems. Distributed shared memory enables deterministic synchronization between all control systems within the wind turbine through improving determinism of time-critical task. Hence optimizing wind turbine generator control operations.

In addition, the wind turbine as described herein provides the ability to stream live data and support vast amounts of data in the wind turbine control network.

Further, the wind turbine as described herein guarantees data delivery to ensure critical data is not lost.

Furthermore, using distributed shared memory (reflective memory), a simulation model may be split up to execute on different control systems simultaneously. To partition the processing load between two or more control systems within a wind turbine may achieve system scalability and attain optimum wind turbine generator performance. The input and output values may be shared between the individual control systems over distributed shared memory (reflective memory).

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A wind turbine comprising:
a plurality of control systems; and
a reflective memory system comprising a respective memory for each one of the plurality of control systems,
wherein the reflective memory system is configured to, in response to data being written to one of the respective memories, automatically replicate the data to other respective memories, and wherein each of the respective memories can be read by all of the plurality of control systems,
wherein a first control system of the plurality of control systems is configured to transmit an interrupt to at least a second control system of the plurality of control systems in response to the data being written to the respective memory in the first control system, wherein, upon receiving the interrupt, the second control system reads the data from the respective memory in the first control system and stores replicated data in the respective memory in the second control system.

2. The wind turbine according to claim 1, wherein the plurality of control systems are connected by a communication network.

3. The wind turbine according to claim 1, wherein the plurality of control systems comprises at least one of a power control system, pitch control system, and a yaw control system.

4. The wind turbine according to claim 1, wherein the respective memory for each control system comprises a dual port memory.

5. The wind turbine according to claim 1, wherein one of the plurality of control systems is configured to inform the other control systems of the plurality of control systems when the data is written to the one respective memory.

6. The wind turbine according to claim 1, wherein the plurality of control systems are connected via a copper or fiber optic cable.

7. The wind turbine according to claim 1, wherein the plurality of control systems are connected on a ring or star topology.

8. The wind turbine according to claim 1, wherein the plurality of control systems are synchronized.

9. The wind turbine according to claim 8, wherein each of the plurality of control systems comprises a synchronization clock circuit, and the plurality of control systems are synchronized with the respective synchronization clock circuit of each control system.

10. A wind turbine comprising:
a plurality of control systems disposed within the wind turbine;
a reflective memory system comprising a respective memory for each one of the plurality of control systems,
wherein the reflective memory system is configured to, in response to data being written to one of the respective memories, automatically replicate the data to other respective memories, and wherein each of the respective memories can be read by all of the plurality of control systems,
wherein a first control system of the plurality of control systems is configured to transmit an interrupt to at least a second control system of the plurality of control systems in response to the data being written to the respective memory in the first control system, wherein, upon receiving the interrupt, the second control system reads the data from the respective memory in the first control system and stores replicated data in the respective memory in the second control system.

11. A method of operating a wind turbine comprising a plurality of control systems and a reflective memory system that includes a respective memory for each one of the plurality of control systems, the method comprising:
storing data in one of the respective memories; and
automatically replicating the data to other respective memories in response to storing data in the one respective memory, wherein each of the respective memories can be read by all of the plurality of control systems, and wherein automatically replicating the data to other respective memories comprises:
transmitting an interrupt from a first control system of the plurality of control system to at least a second control system of the plurality of control system in response to the stored data being written to the respective memory in the first control system;
reading, using the second control system, the stored data from the respective memory in the first control system; and
storing, using the second control system, the stored data in the respective memory in the second control system.

* * * * *